United States Patent

Wolf

(10) Patent No.: US 9,509,238 B2
(45) Date of Patent: Nov. 29, 2016

(54) METHOD AND SYSTEM FOR TRACTION MOTOR TORQUE RIPPLE COMPENSATION

(71) Applicant: Ford Global Technologies, LLC, Dearborn, MI (US)

(72) Inventor: Christopher Wolf, South Bend, IN (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 14/542,722

(22) Filed: Nov. 17, 2014

(65) Prior Publication Data

US 2016/0141984 A1   May 19, 2016

(51) Int. Cl.
*H02P 6/10* (2006.01)
*H02P 6/16* (2016.01)

(52) U.S. Cl.
CPC .. *H02P 6/10* (2013.01); *H02P 6/16* (2013.01)

(58) Field of Classification Search
CPC .................................. H02P 6/10; H02P 6/16
USPC ............................ 318/400.23, 448, 623, 629
See application file for complete search history.

(56) References Cited

U.S. PATENT DOCUMENTS

| | | | |
|---|---|---|---|
| 4,868,477 A | 9/1989 | Anderson et al. | |
| 5,469,215 A | 11/1995 | Nashiki | |
| 5,616,999 A | 4/1997 | Matsumura et al. | |
| 5,998,952 A | 12/1999 | McLaughlin et al. | |
| 6,832,119 B2 | 12/2004 | Miller | |
| 7,232,401 B2* | 6/2007 | Albertson | B60K 6/48 123/192.1 |
| 7,768,220 B2* | 8/2010 | Schulz | H02P 29/0038 318/400.02 |
| 8,880,267 B2* | 11/2014 | Ozaki | B60K 7/0007 701/22 |
| 9,018,870 B2* | 4/2015 | Kobayashi | B60K 6/48 318/400.02 |

* cited by examiner

*Primary Examiner* — Bentsu Ro
(74) *Attorney, Agent, or Firm* — David B. Kelley; Brooks Kushman P.C.

(57) ABSTRACT

Torque ripple produced by a traction motor of an electric vehicle when the motor produces torque from a motor current is compensated for by modifying operation of the motor according to a difference between an expected position of the motor to produce a desired torque from the current and the actual position of the motor when producing torque from the current.

4 Claims, 2 Drawing Sheets

METHOD AND SYSTEM FOR TRACTION MOTOR TORQUE RIPPLE COMPENSATION

TECHNICAL FIELD

The present disclosure relates to compensating for torque ripple of an electric traction motor of an electric vehicle to reduce torque ripple impact on the drivetrain of the vehicle.

BACKGROUND

An electric vehicle includes an electric traction motor. The motor produces a motor torque from electrical energy of a traction battery of the vehicle. The motor provides the motor torque to the drivetrain of the vehicle to propel the vehicle.

The motor torque produced by the motor may include an oscillating motor torque component in addition to a desired motor torque component. The desired motor torque component is the motor torque to be produced by the motor for vehicle propulsion. The oscillating motor torque component is known as torque ripple. Torque ripple provided to the drivetrain may have an impact in the form of noise and vibration. Thus, it is desirable to reduce the presence of torque ripple.

Techniques to reduce torque ripple include designing the motor so as to minimize the production of torque ripple. Such minimization efforts generally raise motor costs and reduce power density and efficiency. Another technique includes pre-calibration. However, this technique does not take into account variability due to manufacturing as the pre-calibration is done for a small representative sample of motors as opposed to motors installed in particular vehicles. Additionally, due to the complex behavior of torque ripple, even an extensive pre-calibration routine is unable to accurately and consistently reduce torque ripple in varied operating conditions.

SUMMARY

In an embodiment, a method for controlling an electric vehicle traction motor includes negating torque ripple based upon a spatially dependent disturbance torque of the motor.

The spatially dependent disturbance torque is based upon disturbance torque of the motor at a plurality of instances of time. Information regarding position of a rotor of the motor may be used to estimate the disturbance torque at the instances of time. Information regarding motor current of the motor may be used to estimate the disturbance torque at the instances of time.

The disturbance torque of the motor at an instance of time may be estimated based upon a difference between an actual position of a rotor of the motor at the instance of time and an expected position of the rotor of the motor at the instance of time. The actual position of the rotor of the motor may be detected using a motor position sensor otherwise used for controlling the motor irrespective of the negating.

In an embodiment, a method includes modifying operation of a motor according to a difference between an expected rotor position of the motor to produce a desired torque from a motor current and actual rotor position of the motor when producing torque from the motor current whereby torque ripple produced by the motor is reduced.

In an embodiment, a method includes detecting a disturbance torque produced by a traction motor of an electric vehicle from a motor current based on a difference between an expected position of the motor to produce an expected torque from the motor current and actual position of the motor when producing torque from the motor current. The method further includes modifying operation of the motor according to the detected disturbance torque to reduce torque ripple outputted from the motor.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
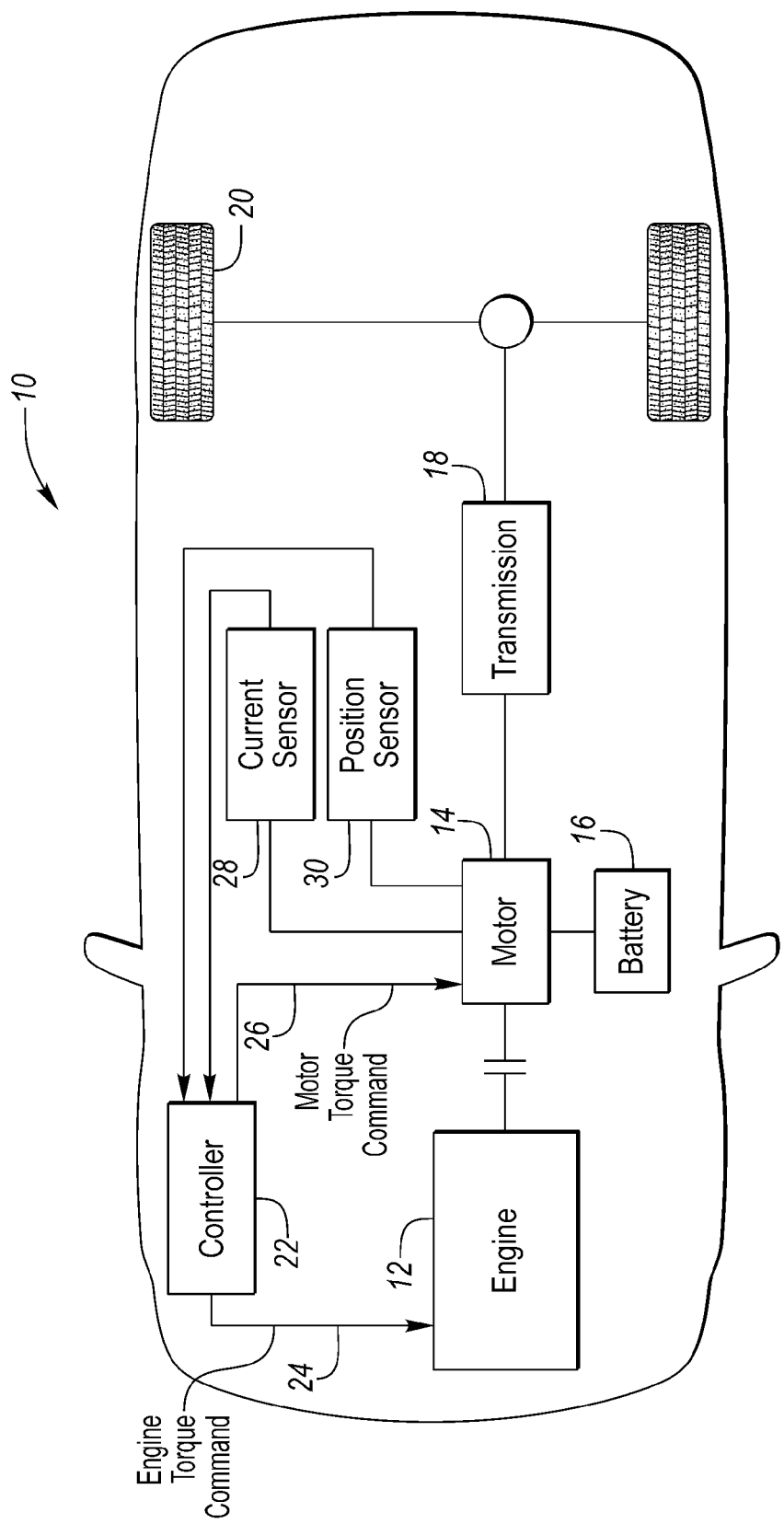
FIG. 1 illustrates a block diagram of the powertrain of an electric vehicle in accordance with an embodiment of the present invention.

Referring now to FIG. 1, a block diagram of the powertrain of an electric vehicle 10 in accordance with an embodiment of the present invention is shown. In this embodiment, electric vehicle 10 is a hybrid electric vehicle (HEV). In other embodiments, electric vehicle 10 is a battery electric vehicle (BEV) lacking an engine.

The powertrain of electric vehicle 10 includes an engine 12, an electric traction motor 14, a traction battery 16, and a drivetrain including a transmission 18. Engine 12 is connectable to motor 14 through a disconnect clutch and motor 14 is connected to the input side of transmission 18, for example, via a torque converter (not shown). The input side of transmission 18 is connected in series with both engine 12 and motor 14 when engine 12 is connected to motor 14. In this case, transmission 18 is connected to motor 14 while at the same time being connected to engine 12 via motor 14. The output side of transmission 18 is connected to drive wheels 20 of vehicle 10.

The powertrain of electric vehicle 10 further includes a vehicle systems controller 22. Controller 22 apportions a drive command between (i) an engine torque command 24 (which represents the amount of engine torque to be provided from engine 12, operating at a corresponding engine speed, to transmission 18 for propelling the vehicle) and (ii) a motor torque command 26 (which represents the amount of motor torque to be provided from motor 14, operating at a corresponding motor speed, to transmission 18 for propelling the vehicle). In turn, engine 12 generates the engine torque and motor 14 generates the motor torque. The engine torque and the motor torque are provided to transmission 18 (assuming that engine 12 is connected to motor 14 via the disconnect clutch) such that the vehicle is propelled.

Motor 14 receives electrical energy from battery 16 to produce motor torque. Motor 14 produces motor torque from electrical current (i.e., motor current) applied to motor 14. The motor current energizes motor 14 to produce motor torque. In particular, a magnetic field generated from energizing motor 14 with motor current produces torque on the rotor of the motor. This torque on the rotor causes the rotor to turn relative to the stator of the motor thereby producing a motor torque. Continuous rotor motion is produced by sequentially positioned magnetic fields generated from energizing motor 14 with motor current. Accordingly, motor 14 produces a given amount of motor torque at each rotor position in response to a given motor current applied to the motor. As such, a desired motor torque to be produced by motor 14 and the rotor position of the motor define the motor current to be applied to the motor for the motor to generate the desired motor torque.

The powertrain of electric vehicle 10 further includes a current sensor 28 and a position sensor 30. Current sensor 28 and position sensor 30 are in communication with controller 22. Current sensor 28 and position sensor 30 are further in operative arrangement with motor 14. Current sensor 28 is configured to detect motor current (i.e., the amount, magnitude, and/or phase, etc.) applied to motor 14 from which the motor produces motor torque. Current sensor 28 provides a motor current signal indicative of the motor current to controller 22. Position sensor 30 is configured to detect the rotary position of the rotor of motor 14 relative to the stator of the motor (i.e., the motor position). Position sensor 30 provides a position signal indicative of the motor position (i.e., 0-360°) to controller 22.

In one embodiment, motor 14 is a synchronous permanent magnet (PM) motor. However, motor 14 may take the form of other motor types. In any case, when motor 14 is continuously energized with a fixed level of motor current, the amount of motor torque produced by motor 14 varies as a function of the motor position (i.e., as a function of the position of the rotor relative to the stator). This variation in the motor torque is the torque ripple. As such, the torque ripple is the difference between the maximum and minimum motor torques produced by motor 14 as the motor is energized with the motor current. The torque ripple varies with time (i.e., oscillates) while motor 14 is continuously energized.

As described above, a desired motor torque to be produced by motor 14 when the motor is at a given motor position defines the motor current to be applied to the motor for the motor to produce the desired motor torque. Thus, controller 22 can control motor 14 to produce the desired motor torque by causing the defined motor current to be applied to the motor when the motor is at the given motor position. Controller 20 thereby knows what motor torque should be produced by motor 14 (i.e., the desired motor torque) in response to a given motor current applied to the motor when the motor is at a given motor position. Likewise, controller 20 thereby knows what the motor position should be when motor 14 produces the desired motor torque in response to the given motor current applied to the motor. As such, controller 22 uses the information regarding the detected motor current from current sensor 28 and the detected (i.e., actual) motor position from position sensor 30 in controlling motor 14 to produce a desired motor torque.

However, as further described above, in addition to the desired motor torque, motor 14 produces torque ripple. The motor torque provided from motor 14 to transmission 18 thereby includes the desired motor torque and the torque ripple. As the torque ripple may cause noise and vibration, it is desired to minimize the amount of torque ripple outputted from motor 14.

Figure 2:
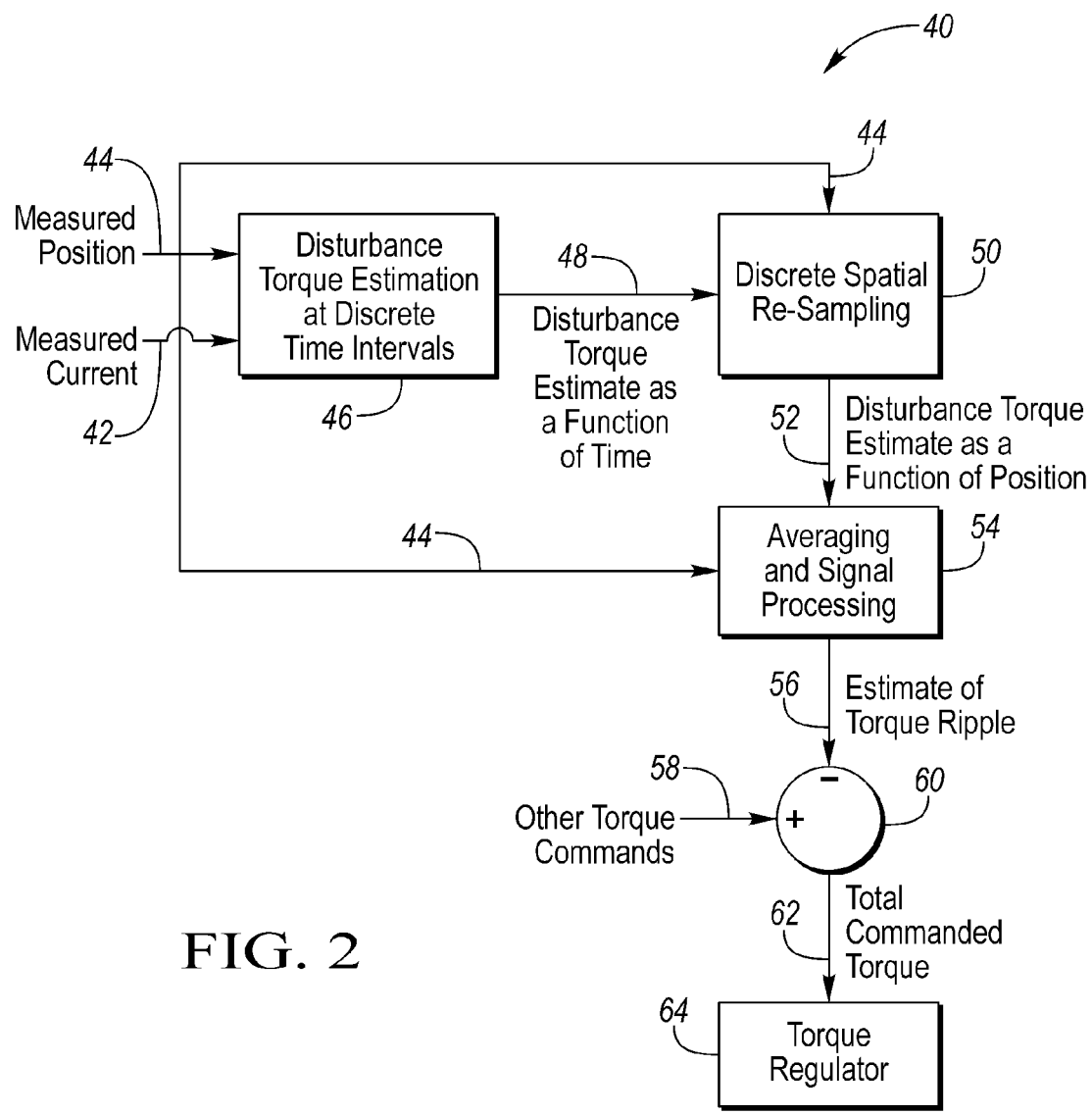
FIG. 2 illustrates a signal flow diagram depicting operation of a vehicle systems controller of an electric vehicle for compensating for torque ripple of the traction motor of the vehicle to reduce torque ripple impact on the drivetrain of the vehicle in accordance with an embodiment of the present invention.

Referring now to FIG. 2, with continual reference to FIG. 1, a signal flow diagram 40 depicting operation of controller 22 for compensating for torque ripple of motor 14 to reduce torque ripple impact on the drivetrain of vehicle 10 in accordance with an embodiment of the present invention is shown. As shown in FIG. 2, during the operation, controller 22 receives a motor current signal 42 indicative of the motor current applied to motor 14 from current sensor 28 and a motor position signal 44 indicative of the motor position from position sensor 30.

As indicated by block 46, controller 22 estimates the disturbance torque at discrete time intervals. The disturbance torque at a given time is the difference between the actual torque produced by motor 14 at the given time and the desired (i.e., expected) torque produced by the motor at the given time. Controller 22 uses the information regarding the motor current and the motor position in estimating the disturbance torque at the discrete time intervals (i.e., estimating the disturbance torque at each of spaced-apart instances of time).

As described above, controller 22 expects the position of motor 14 to be at an expected motor position when motor 14 produces the desired (i.e., expected) motor torque in response to a corresponding pre-defined motor current. However, because motor 14 also produces torque ripple, the actual motor torque produced by the motor differs from the expected motor torque. The difference is the disturbance torque. Further, the position of motor 14 is at an actual motor position different than the expected motor position as the motor produces the actual motor torque different from the expected motor torque. As such, the difference between the actual motor position and the expected motor position is indicative of the disturbance torque. The magnitude of the disturbance torque is proportional to the difference in magnitude between the actual and expected motor positions.

Controller 22 thus uses the actual motor position (motor position signal 44) and the motor current (motor current signal 42) to estimate the disturbance torque. That is, controller 22 estimates the disturbance torque based on motor current according to a comparison of the actual motor position with the expected motor position. Controller 22 performs this estimation at discrete time intervals as indicated in block 46 to thereby generate an output signal 48 indicative of the estimated disturbance torque as a function of time.

As indicated by block 50, controller 22 performs a discrete spatial re-sampling of the disturbance torque estimate outputted from block 46. A purpose of the discrete spatial re-sampling is to re-sample the disturbance torque estimate at constant motor position spatial intervals yielding an estimate of the disturbance torque as a function of motor position. For this process, controller 22 receives output signal 48 indicative of the estimated disturbance torque as a function of time and motor position signal 44. A value of the estimated disturbance torque from output signal 48 and a value of the actual motor position from motor position signal 44 are associated with each discrete time interval. Many discrete time intervals exist as controller 22 performs the disturbance torque estimation of block 46 over a plurality of revolutions of (the rotor of) motor 14. Accordingly, many pairs of estimated disturbance torque values and actual motor position values for each of a plurality of discrete time intervals are obtained by controller 22. In turn, controller 22 uses this information to interpolate the estimated disturbance torque for any motor position values including any actual motor positions which have not yet occurred or have rarely occurred. Controller 22 thereby generates an output signal 52 indicative of the estimated disturbance torque as a function of motor position.

As indicated in block 54, controller 22 performs an averaging and signal processing of the estimated disturbance torque outputted from block 50. For these processes, controller 22 receives output signal 52 indicative of the estimated disturbance torque as a function of motor position and motor position signal 44. For the averaging process, controller 22 averages the estimated disturbance torque values obtained over the plurality of motor revolutions for each motor position to produce an estimated disturbance torque value for the motor position. For the signal processing operation, controller 22 receives the actual motor position from motor position signal 44 and outputs the estimated disturbance torque value for this motor position. The averaging and signal processing continue such that controller 22 outputs the estimated torque value for the current actual motor position. Controller 22 thereby generates an output signal 56 indicative of the estimated torque ripple at any of the motor positions.

In operation, as shown in FIG. 2, controller 22 generates a torque command 58 which represents a desired (i.e., an expected) motor torque to be provided from motor 14 to transmission 18 for propelling vehicle 10. As described above, controller 22 controls motor 14 to produce the expected motor torque by applying a predefined motor current to the motor when the motor is at a corresponding motor position. Controller 22 is aware of the motor position from motor position signal 44. Thus, torque command 58 is indicative of the predefined motor current to be applied to motor 14 based on the actual motor position for the motor to produce the desired motor torque. However, as described above, the actual motor torque produced by motor 14 in response to the predefined motor current when the motor is at the corresponding motor position differs from the expected motor torque as the motor also produces torque ripple. As further described above, the difference is the disturbance torque at the corresponding motor position.

Output signal 56 is indicative of the disturbance torque at the corresponding motor position. As indicated by calculator 60, controller 22 subtracts the value of the disturbance torque (i.e., the torque ripple) at the corresponding motor position in output signal 56 from the value of the expected motor torque in torque command 58. As a result of this compensation, the actual motor torque that will be produced by motor 14 is (approximately) the expected motor torque as the torque ripple will be eliminated (or at least reduced). That is, the actual motor torque that will be produced by motor 14 is a summation of (i) the expected motor torque, (ii) the disturbance torque, which the motor produces in the absence of compensation, and (iii) a negative of the magnitude of an estimate of the disturbance torque, which is obtained from torque ripple estimate output signal 56. In turn, controller 22 outputs a resulting total commanded torque command 62 which represents the expected motor torque which will actually be produced by motor 14 as a result of the torque ripple compensation. Controller 22 outputs total commanded torque command 62 to a torque regulator 64 associated with motor 14 to command the motor to produce the motor torque. As such, controller 22 controls motor 14 to produce a desired motor torque without torque ripple.

Methods and systems for compensating for torque ripple of the traction motor of an electric vehicle to reduce torque ripple impact on the drivetrain of the vehicle have been described. Existing vehicle sensors (e.g., motor current and rotor position sensors) are utilized to estimate torque ripple and this estimate is used to command an opposite torque in the motor. A net effect is the reduction of the impact of torque ripple. As further described with reference to FIG. 2, an estimate of the disturbance torque acting on the drivetrain can be obtained using the existing sensor set. The disturbance is re-sampled at constant spatial intervals yielding an estimate of the disturbance torque as a function of motor (rotor) position. As the (low-speed) torque ripple is also a function of the motor position, the estimate of the spatially dependent disturbance torque provides an estimate of the torque ripple. This estimate is negated and applied in the form of a torque command thereby reducing the net torque ripple of the motor.

Although an automotive environment has been illustrated in the drawings and described herein, embodiments of the present invention are also directed to non-automotive environments having electric motors. In sum, while exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for controlling a traction motor, comprising:
   at times over multiple revolutions of the motor, detecting disturbance torques based upon differences between actual and expected motor positions;
   spatially re-sampling the detected disturbance torques into disturbance torque estimates for respective motor positions over one revolution including the actual motor positions and other motor positions;
   negating torque ripple by adjusting a motor torque command with the disturbance torque estimates according to subsequently occurring actual motor positions.

2. The method of claim 1 further comprising:
   using information regarding motor current of the motor in detecting the disturbance torques.

3. The method of claim 1 further comprising:
   detecting the actual motor positions using a motor position sensor otherwise used for controlling the motor irrespective of the negating.

4. A system for controlling an electric vehicle traction motor, comprising:
   a detector to detect actual motor positions of the motor as the motor rotates; and
   a controller configured to, at times over multiple revolutions of the motor, detect disturbance torques based upon differences between actual and expected motor positions, and the controller further configured to spatially re-sample the detected disturbance torques into disturbance torque estimates for respective motor positions over one revolution including the actual motor positions and other motor positions and negate torque ripple by adjusting a torque command for the motor with the disturbance torque estimates according to subsequently occurring actual positions of the motor.

* * * * *